United States Patent
Seksaria et al.

(10) Patent No.: US 6,994,363 B2
(45) Date of Patent: Feb. 7, 2006

(54) TAILGATE EXTENSION

(75) Inventors: Dinesh Seksaria, Novi, MI (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/821,759

(22) Filed: Apr. 8, 2004

(65) Prior Publication Data

US 2004/0227368 A1 Nov. 18, 2004

Related U.S. Application Data

(63) Continuation-in-part of application No. 10/167,767, filed on Jun. 11, 2002, now abandoned.

(51) Int. Cl.
*B60R 3/00* (2006.01)

(52) U.S. Cl. ..................... 280/166; 296/26.1
(58) Field of Classification Search ............... 280/166; 296/26.1, 26.11, 57.1, 61, 62; D12/196, D12/414
See application file for complete search history.

(56) References Cited

U.S. PATENT DOCUMENTS

| | | |
|---|---|---|
| 3,454,299 A | 7/1969 | Hewitt et al. .................. 296/50 |
| 4,021,071 A | 5/1977 | Norman ........................ 296/62 |
| 4,023,850 A | 5/1977 | Tillery ......................... 296/26 |
| 4,114,944 A | 9/1978 | Joynt et al. ................... 296/50 |
| 4,161,997 A | 7/1979 | Norman ........................ 182/93 |
| 4,305,694 A | 12/1981 | Chan .......................... 414/482 |
| 4,472,639 A | 9/1984 | Bianchi ........................ 296/26 |
| 4,531,773 A | 7/1985 | Smith .......................... 296/26 |
| 4,580,828 A | 4/1986 | Jones .......................... 296/57 |
| 4,639,032 A | 1/1987 | Barbour ........................ 296/62 |
| 4,778,213 A | 10/1988 | Palmer ......................... 296/26 |
| 5,244,335 A | 9/1993 | Johns ......................... 414/537 |
| 5,425,564 A * | 6/1995 | Thayer ........................ 296/61 |
| 5,456,479 A | 10/1995 | Conger ....................... 280/165 |
| 5,468,038 A | 11/1995 | Sauri ......................... 296/57.1 |
| 5,533,771 A | 7/1996 | Taylor et al. ................. 296/26 |
| 5,605,367 A * | 2/1997 | Mc Cormack ............. 296/57.1 |
| 5,732,995 A | 3/1998 | Piccariello ................. 296/57.1 |
| 5,732,996 A | 3/1998 | Graffy et al. ................. 296/62 |
| 5,739,995 A | 4/1998 | Ohmi et al. ................ 360/137 |
| 5,741,039 A | 4/1998 | Habdas ....................... 296/57.1 |
| 5,803,523 A | 9/1998 | Clark et al. ................ 296/26.1 |
| 5,806,907 A | 9/1998 | Martinus et al. .......... 296/26.11 |
| 5,816,638 A | 10/1998 | Pool, III ................... 296/26.11 |
| 5,820,193 A | 10/1998 | Straffon ....................... 296/62 |
| 5,826,932 A | 10/1998 | DeSimone ................. 296/57.1 |
| 5,902,000 A | 5/1999 | Wold ........................... 296/26 |
| 5,924,753 A | 7/1999 | DiBassie ................. 296/26.09 |
| 5,941,588 A | 8/1999 | Marconi ................... 296/26.11 |

(Continued)

*Primary Examiner*—Bryan Fischmann
(74) *Attorney, Agent, or Firm*—Harry A. Hild, Jr.; Eckert Seamans Cherin & Mellott, LLC (57) ABSTRACT

A vehicle tailgate extension apparatus and method of using the same. The tailgate extension apparatus generally includes a U-frame member, a plurality of hinge elements, and a plurality of side braces. The U-frame member may be locked into a plurality of operative positions optionally including a backstop position, an extension position, and a step position. The extension apparatus is stored within the interior of the tailgate until needed, and the extension may be pulled out of the tailgate via a plurality of storage channels. The side braces directly connect the U-frame member to the vehicle tailgate and may be stored within the arms of the U-frame when the extension apparatus is stowed in the tailgate.

30 Claims, 11 Drawing Sheets

U.S. PATENT DOCUMENTS

| | | |
|---|---|---|
| 5,944,373 A | 8/1999 | Seksaria et al. ............ 296/57.1 |
| D415,988 S | 11/1999 | Stearns ...................... D12/196 |
| 5,997,066 A | 12/1999 | Scott ....................... 296/26.08 |
| 6,042,167 A | 3/2000 | Pierce et al. ............. 296/26.08 |
| 6,082,801 A | 7/2000 | Owen et al. ............. 296/26.11 |
| 6,113,171 A | 9/2000 | Stearns .................... 296/26.08 |
| 6,142,548 A | 11/2000 | Kuhn et al. ................ 296/26.1 |
| 6,257,637 B1 | 7/2001 | Reed ....................... 296/26.08 |
| 6,267,429 B1 | 7/2001 | Kuzmich et al. ............. 296/50 |
| 6,364,392 B1 | 4/2002 | Meinke ....................... 296/62 |
| 6,454,338 B1 * | 9/2002 | Glickman et al. ......... 296/57.1 |
| 6,739,639 B1 * | 5/2004 | Chumley et al. ........ 296/26.08 |
| 6,805,392 B2 * | 10/2004 | Leitner et al. ........... 296/26.08 |
| 6,918,624 B2 * | 7/2005 | Miller et al. .................. 296/62 |
| 2003/0075943 A1 * | 4/2003 | Kirchhoff ................ 296/26.11 |

\* cited by examiner

TAILGATE EXTENSION

CROSS REFERENCE TO RELATED APPLICATION

This patent application is a continuation in part application claiming priority from Unites States Patent Application: Tailgate Extension Apparatus, Ser. No. 10/167,767 filed on Jun. 11, 2002 now abandoned.

FIELD OF THE INVENTION

The present invention relates to tailgates for vehicles, and, in particular, it relates to extensions for tailgates which facilitate the carrying of certain types of cargo, or entry into the cargo space.

BACKGROUND OF THE INVENTION

Figure 1:
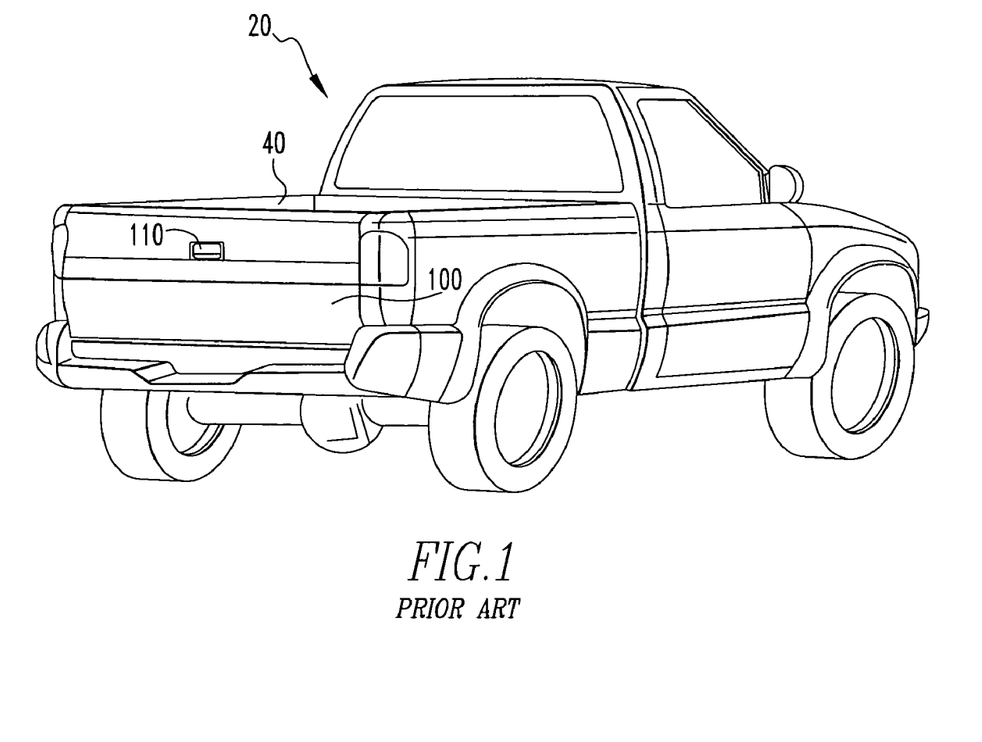
FIG. 1 is a schematic view of a pickup truck from the rear with the tailgate in a locked vertical position.

As seen in FIG. 1, vehicles 20 such as pick-up trucks, station wagons, sport utility vehicles (SUVs), or other vehicles have cargo spaces 40 that are used for hauling materials. Such a vehicle, typically, has a tailgate 100 that serves as a barrier, thereby retaining the cargo within the bed. Many of these tailgates 100 are hingedly attached to the bed or vehicle frame at the lower portion of the tailgate, and the tailgate 100 can function in a vertical, locked position or a horizontal, open position.

Oftentimes, however, it is necessary to transport items that do not fit within the standard cargo space available when the tailgate is locked in a vertical position. This problem has been exacerbated in recent years by the influx of smaller vehicles on the automotive market. As such, a user is required to transport the cargo with the tailgate in an open horizontal position or with the cargo extending beyond the upper edge of a vertical tailgate. In either case, the user is required to take additional steps to manually secure the cargo in the bed. These additional steps may be time-intensive and prone to failure, resulting in the cargo accidentally falling out of the vehicle or becoming damaged.

Another difficulty frequently encountered when using conventional tailgates concerns entry/exit into and out of the cargo space or truck bed. Although it is desirable to access the inside of a truck bed, conventional open tailgates are too high to be used as a step, especially for people of a lower stature or people carrying items in their arms. As a result, access to cargo beds is often limited since most users cannot step from the ground directly into the cargo bed.

Thus a common problem with conventional tailgates is that they have inherent size limitations, both because the length of the bed is too short and because the tailgate is situated too far above the ground. As a result, extension devices for tailgates have been proposed, albeit often to address only one of the aforementioned problems. Many of the prior extension devices include pieces that are removably attached to the tailgate or, though permanently attached, are located external to the tailgate itself. Although such devices may be useful, they are frequently cumbersome and are not practical for everyday use since they require time-consuming setup procedures. Also, existing tailgate extensions and step devices may be stored externally when not in use. Such external storage ultimately takes up a portion of the existing bed space and can also be unsightly. Furthermore, conventional tailgate extensions do not attempt to combine the tailgate extensions and stepping devices into one, easily manipulated and stored unit.

Thus, there presently exists a need for a combination extension/stepping device that is easy to use, can be compactly stored, is convenient for the user to access, and can be readily set up to extend the working area of a bed and/or to create a step to enhance access to the bed.

INTRODUCTION TO THE INVENTION

One presently preferred embodiment of the invention provides a tailgate extension apparatus capable of performing as a backstop, a tailgate extension, and/or a step for use with a conventional cargo area in a vehicle. The tailgate extension generally comprises: a U-frame member including side arms and a step; two side braces; and two hinges. The side braces selectively connect the U-frame member directly to the vehicle tailgate. The hinges allow for rotation of the U-frame member such that the aforementioned positions (backstop, extension, and step) may be realized.

In at least one preferred embodiment, the tailgate extension apparatus may be stored within the vehicle tailgate and may be extendable by way of a plurality of channels located within the tailgate. These channels are preferably facilitated through the use of a hybrid tailgate that includes a metal skin wrapped around a plastic reinforcing module.

The side arms of the U-frame member, preferably, contain recesses in which the braces may be stored when the extension member is in its stored position inside the vehicle tailgate. In this way, the U-frame member, the braces, and the hinges may all be stored within the tailgate and are not visible from the outside of the vehicle, and are not stored in the cargo space of the vehicle.

The invention also comprises methods for removing and locking the tailgate extension apparatus into various useful positions. To use the tailgate extension apparatus, the user may unlatch and lower the vehicle tailgate, release and extend the U-frame member, and rotate and lock the U-frame member into a final usable position. The side braces may be removed from the tailgate extension apparatus by extracting the braces laterally from the side recesses of the arms of the U-frame member. These side braces may then be used to lock the extension at an appropriate angle to the tailgate using conventional tailgate latches. Preferably, the tailgate extension apparatus may be locked in various positions to create a backstop, extension or step.

It is to be understood that both the foregoing general description and the following detailed description are exemplary and explanatory only and are not restrictive of the invention, as claimed.

SUMMARY OF THE INVENTION

The present invention is an extension apparatus for a vehicle tailgate. It includes a U-frame member, which is slidingly extendable from an interior portion of the vehicle tailgate; and it also includes a plurality of side braces adapted to lock said U-frame member in a plurality of operative positions.

In another aspect, the present invention is a method for utilizing a tailgate extension apparatus. The method includes the steps of opening a vehicle tailgate into a substantially horizontal position, extending a U-frame member from a storage position within said tailgate to a position outside of the tailgate; and locking said U-frame member into one of three operative positions by means of two side braces which accommodate all positions.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Figure 6:
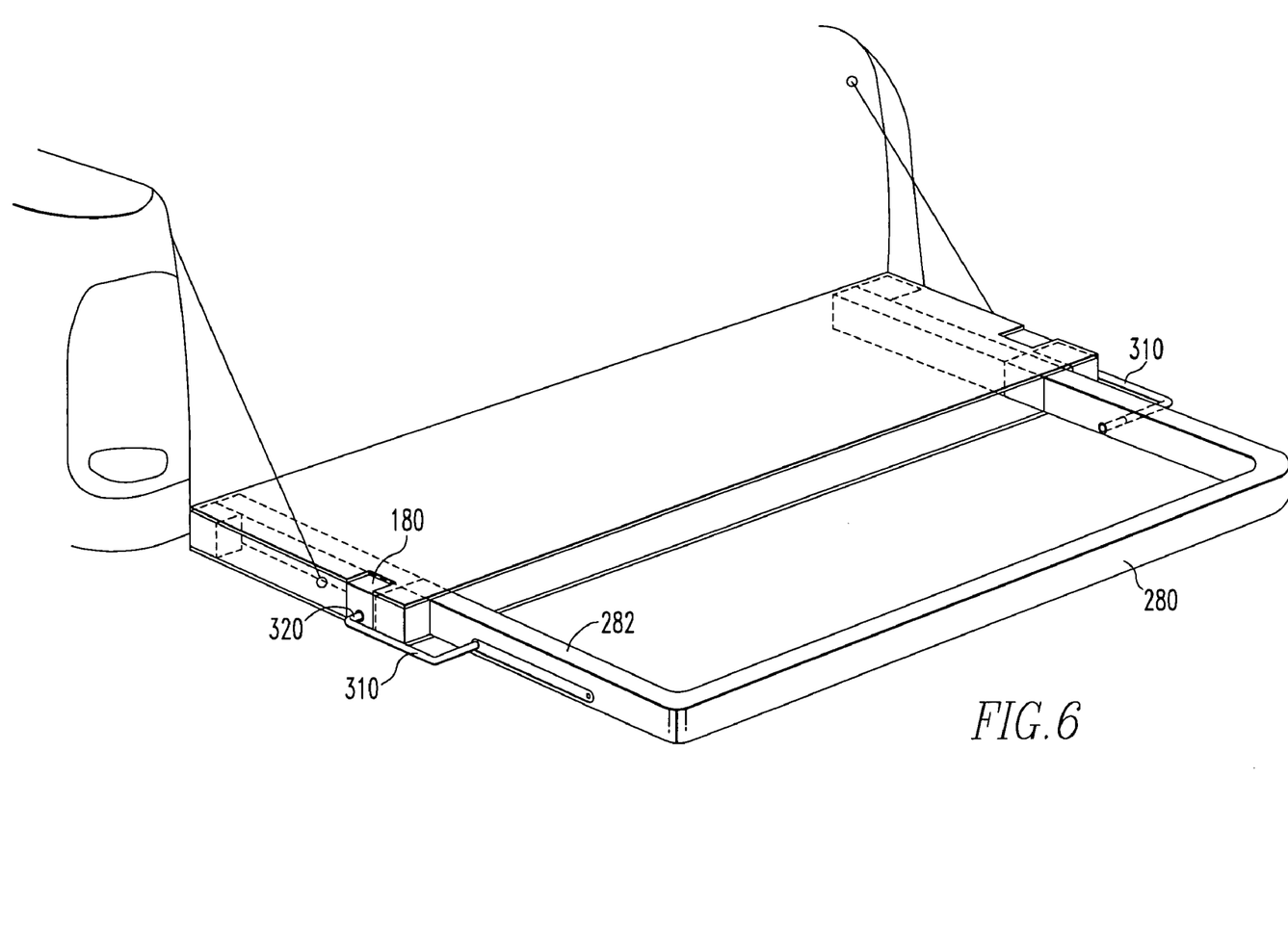
FIG. 6 is a schematic view of the tailgate extension apparatus in the extension position.
Figure 7:
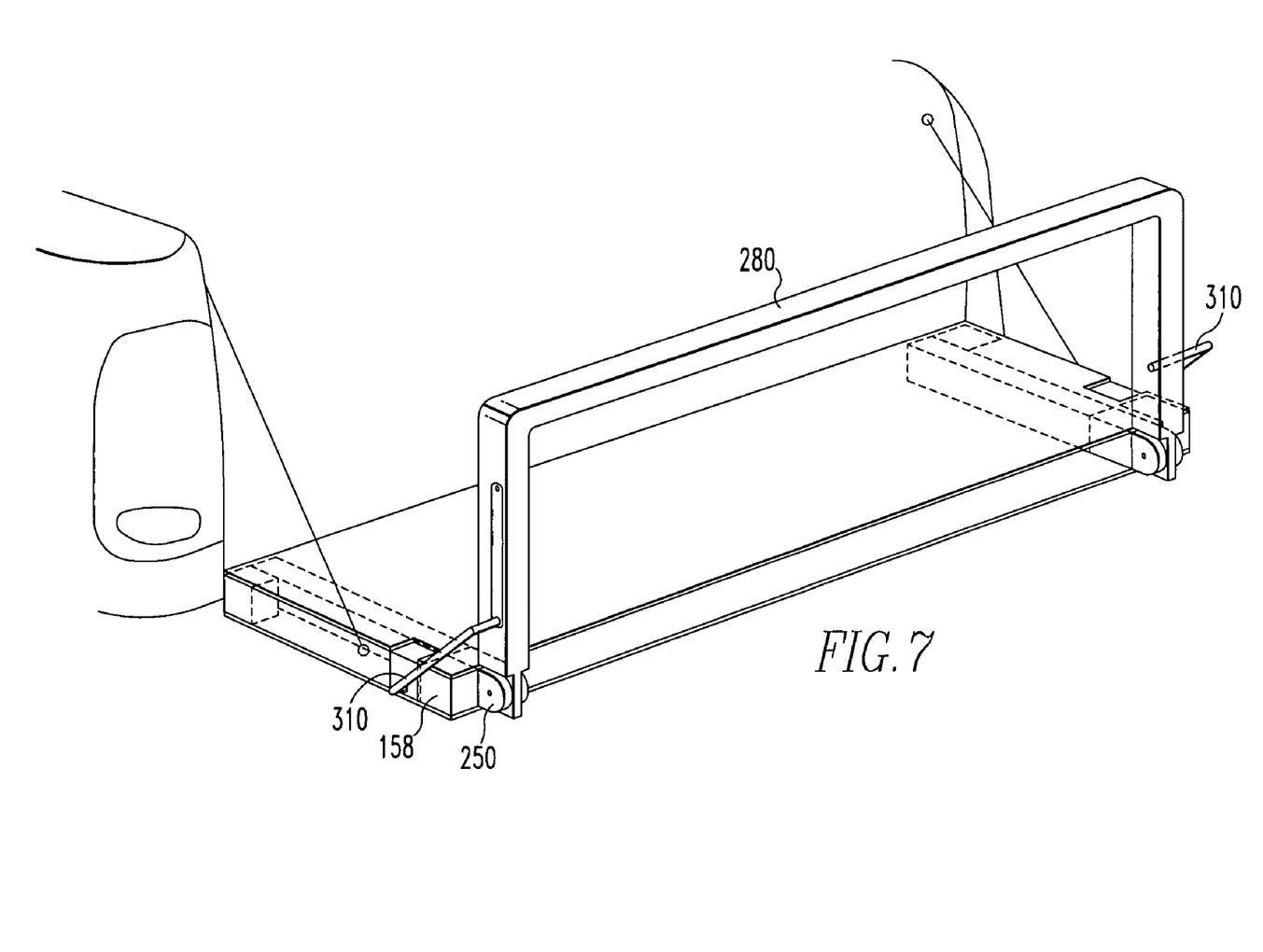
FIG. 7 is a schematic view of the tailgate extension apparatus in the backstop position.
Figure 8:
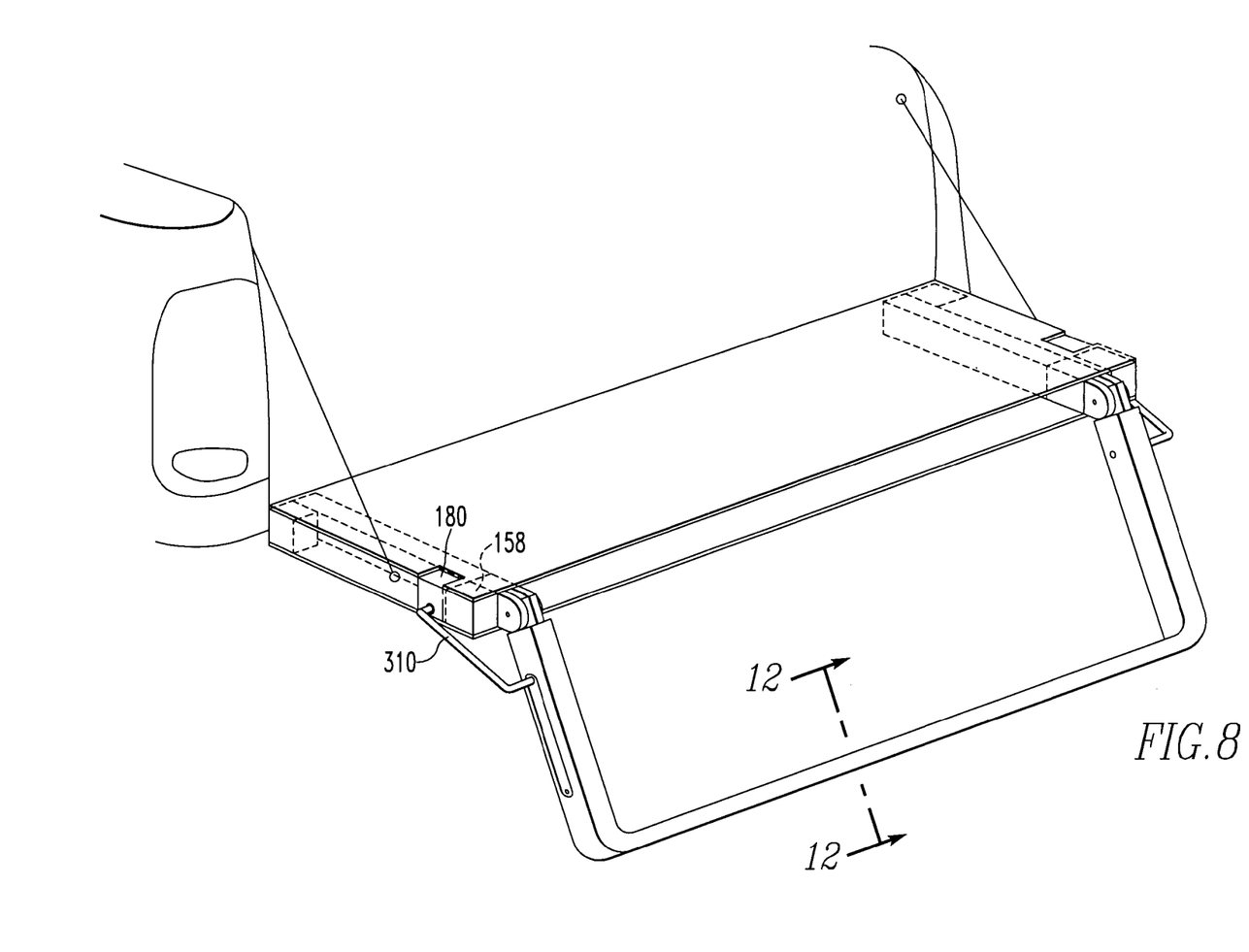
FIG. 8 is a schematic view of the tailgate extension apparatus in the step position.

In accordance with the present invention, a tailgate extension apparatus is provided that is capable of functioning in conjunction with a conventional tailgate (FIG. 1) to add the functionality of three additional positions (FIGS. 6, 7, and 8). Initially referring to FIG. 1 of the drawings, a tailgate extension apparatus is incorporated in a vehicle 20 with a drop down tailgate 100. Handle 110 is for releasing latches (discussed later) which enable tailgate 100 to drop down to a horizontal position. Although the vehicle 20 shown in FIG. 1 is a pick-up truck, the invention may be used with many different kinds of cargo-carrying vehicles. The tailgate 100 is preferably a hybrid tailgate (described below) comprised of a plastic inner structural module (reinforcing module) surrounded by a thin metal skin, but the present invention may also be used with a conventional hollow steel tailgate. When in its FIG. 1 stored position, the tailgate extension apparatus can not be seen, except along the top edge of the tailgate 100.

Figure 2:
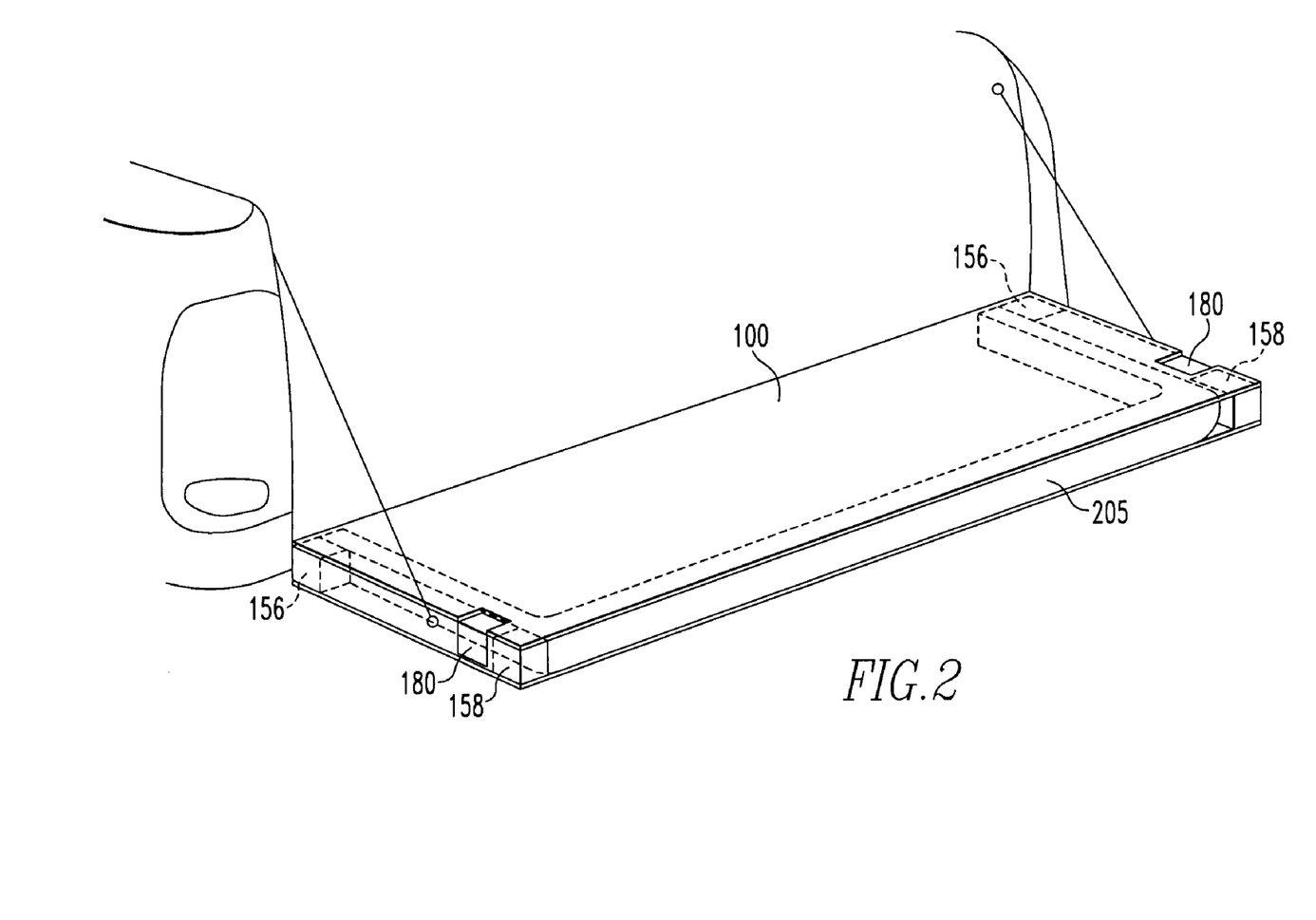
FIG. 2 is a schematic view of the tailgate extension apparatus stored within a tailgate which is in the open position.
Figure 3:
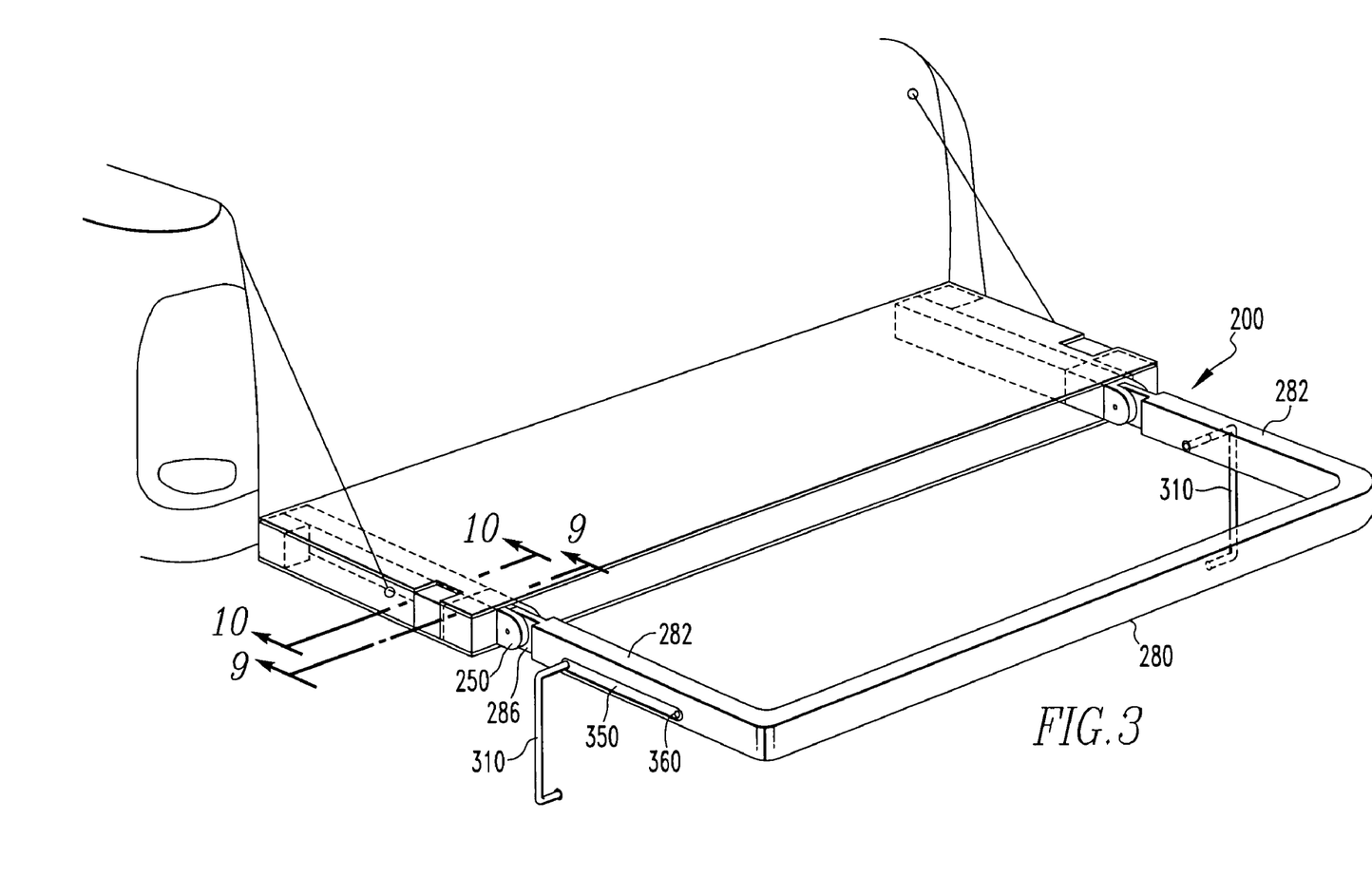
FIG. 3 is a schematic view of the tailgate extension apparatus pulled out from within the tailgate with hinges attached thereto and with side braces shown hanging from the sidearms of the tailgate extension apparatus.

FIG. 2 schematically illustrates the tailgate 100 in its horizontal position, and FIG. 3 shows the tailgate extension apparatus 200 pulled out from its storage position inside tailgate 100. The tailgate extension apparatus 200 generally comprises: two side arms 282, a step portion 280, two side braces 310 that are removably attached to the side arms 282, and a plurality of hinges having non-rotating portions 250 and rotating portions 286. These are for enabling pivoting of the extended tailgate extension apparatus 200 between a plurality of operative positions. All of these components of the tailgate extension apparatus 200 are retractably mounted within the tailgate 100, as indicated by dotted lines in FIG. 2. The operative positions preferably include a tailgate extension position (FIG. 6), a tailgate backstop position (FIG. 7) and a step position (FIG. 8).

Preferably, the sidearms 282 and step 280 of tailgate extension apparatus 200 are integrally formed as a U-frame member 205. Preferably, U-frame member 205 is formed of of extruded metal tubing, preferably aluminum or steel, but it could, alternatively, be made of a plastic, composite, or other material. Lighter materials are preferred to limit the overall weight of the tailgate and increase the ease with which the tailgate may be used.

Figure 4:
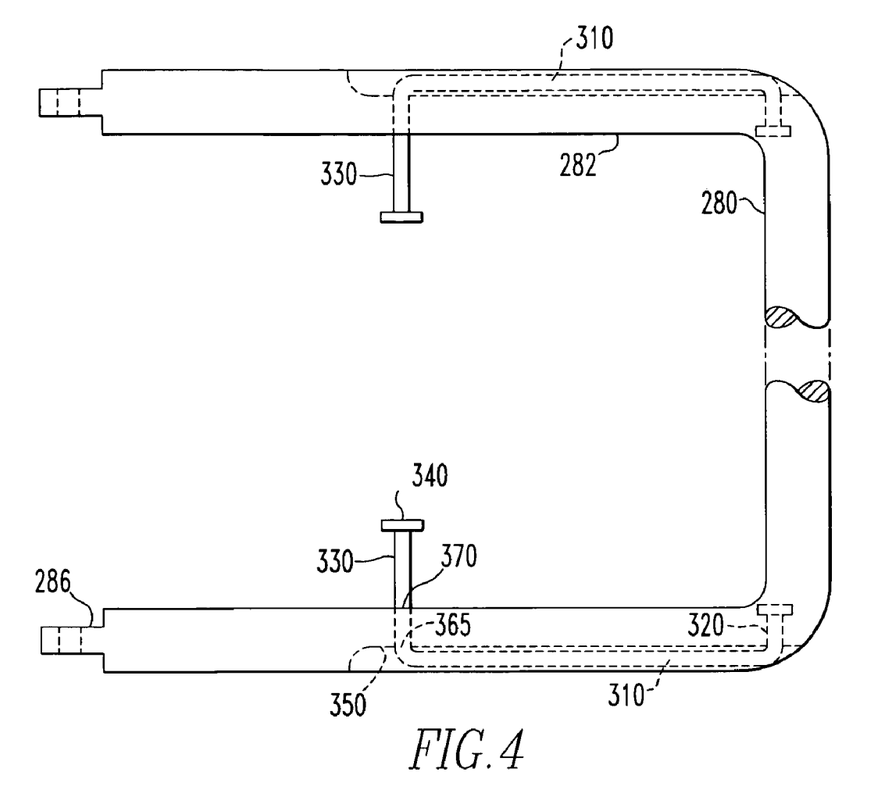
FIG. 4 is a schematic top view of the tailgate extension showing side braces stored within the side arms of the tailgate extension.

FIG. 4 is a top view of the U-frame member 205 showing how side braces 310 are stored when the tailgate extension apparatus 200 is stored within tailgagte 100. The two side arms 282 of the tailgate extension 200 preferably include storage recesses 350 into which the side braces 310 may be stored when the tailgate extension apparatus 200 in not in use. The recesses 350 are in the outwardly facing sides of the side arms 282. Each recess 350 preferably also includes a hole 360 (best seen in FIG. 3) through which the locking post 320 of side brace 310 may be inserted. Each recess preferably also includes a hole 365 for the offset portion 330 of the side brace 310. A through hole 370 in the inwardly facing sides of the side arms 282 is also provided for the offset portion 330 of the side brace 310.

Preferably, a threaded mechanical fastener 340, such as a cap screw, selectively prevents the side brace 310 from disengaging completely from the side arm 282. The side brace 310 may be retained in its storage position by a clip or other fastening device (not shown) that functions to hold the brace 310 in place yet also releases it from the sidearm 282 when adequate lateral pressure is applied to the brace.

The U-frame member 205, preferably, has various cross-sections at different parts (such as rectangular, round, oval or otherwise shaped in profile), with the appropriate cross-section profile being chosen for the purpose that any particular area of the member is intended to serve.

In a presently preferred embodiment, the U-frame member 205 is a hollow extruded aluminum tube that has a circular or oval profile upon extrusion. The tube may then be hydroformed to impute the angles necessary to create the step 280, the recesses 350 for the side braces 310, and other features. The step 280 itself may have a more "flattened" profile such as an oval or "C" shape so that the upper portion of the step (when the U-frame 205 is in the step position) provides a broad, flat surface area upon which a user can step. In additional embodiments, the various segments (e.g., 280, 282) of the U-frame member 205 may be manufactured separately, and then brought together before being installed into the tailgate. Many different variations on this theme are envisioned within the scope of the invention.

Figure 9:
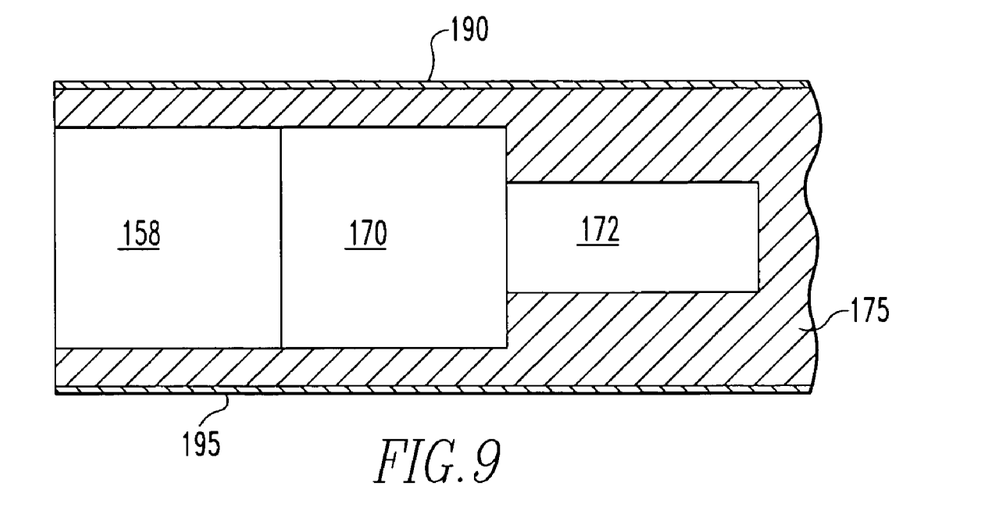
FIG. 9 is a schematic cross section showing a channel in the reinforcing module, the channel being for a sidearm of the tailgate extension.
Figure 10:
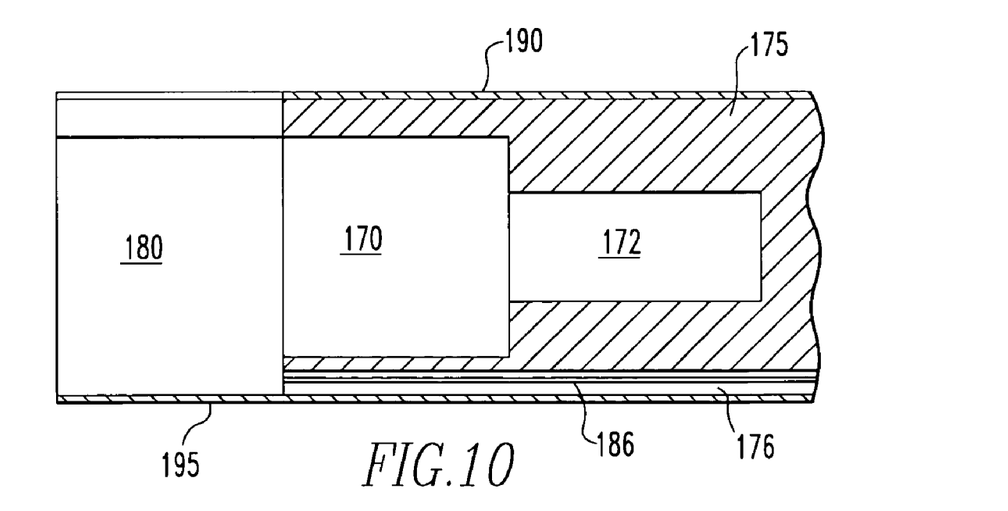
FIG. 10 is a schematic cross section showing a wire from the tailgate handle to one of the tailgate latches.

The tailgate 100 preferably includes two hollow slots or channels 170 that serve to house and guide the arms 282 of the tailgate extension 200. FIG. 3 defines two sections, 9—9 and 10—10. The former section is shown in FIG. 9 and the latter is shown in FIG. 10. Channels 170, which are visible in FIGS. 9 and 10 guide the tailgate extension 200 to move from its its stored position (FIG. 2) to its extended (operative) positions (FIGS. 6, 7, and 8).

Referring to FIGS. 9 and 10, the inner portion 172 of channel 170 is provided to accommodate the offset portion 330 of side brace 310 as the tailgate extension 200 is moved between its stored position, as shown in FIG. 2 to its extended position, as shown in FIG. 3. FIGS. 9 and 10 show the structure of the hybrid tailgate. The upper metal skin 190 and the lower metal skin 195 are shown, above and below the reinforcing module 175, respectively.

FIG. 10 shows a wire 186 which connects the tailgate handle 110 to one of the tailgate latches 180. A similar wire (not shown) connects the tailgate handle 110 to the opposito latch. The latches 180 capture posts on the vehicle 20 when the tailgate is in the raised position shown in FIG. 1. Release of the latches 180 permits the tailgate to be lowered to the position shown in FIGS. 2 and 3. Following conventional practice, the latches 180, preferably, are spring loaded to the closed position. When handle 110 is pulled, opening forces are applied to the latches 180 through wires 186. Wires 186 pass through transverse slots 176 in reinforcing module 175.

The present invention is preferably incorporated into a so-called "hybrid" tailgate but may also be used with an adapted conventional tailgate. A conventional tailgate is typically manufactured by forming a flat sheet of steel into the shape of a tailgate and thereafter welding the edges together. These tailgates are heavy to work with, and alternative solutions are continually sought.

A hybrid tailgate, on the other hand, includes an interior reinforcing module of plastic or other lightweight material that is formed as the framework of the tailgate. A thin sheet of metal, such as aluminum, is then assembled around the outside of this reinforcing member. The plastic/aluminum (or other) combination may be as strong as a conventional steel tailgate but is lighter and easier to work with. The general structure of a hybrid tailgate is disclosed, for example, in U.S. Pat. No. 5,944,373 which issued on Aug. 31, 1999, and which is incorporated herein by reference in its entirety.

With a conventional tailgate, the channels 170 that guide and store the arms 282 of the U-frame member 205 may have to be specifically formed within the tailgate. With the preferred hybrid tailgate, however, the channels 170 may be made by hollowing out part of the plastic reinforcing member that makes up the interior of the hybrid tailgate structure. Because the plastic reinforcing member already exists within the hybrid tailgate and further because plastic is an easier material to shape (mold) than steel, creating the channels 170 in the hybrid tailgate is preferred.

Figure 5:
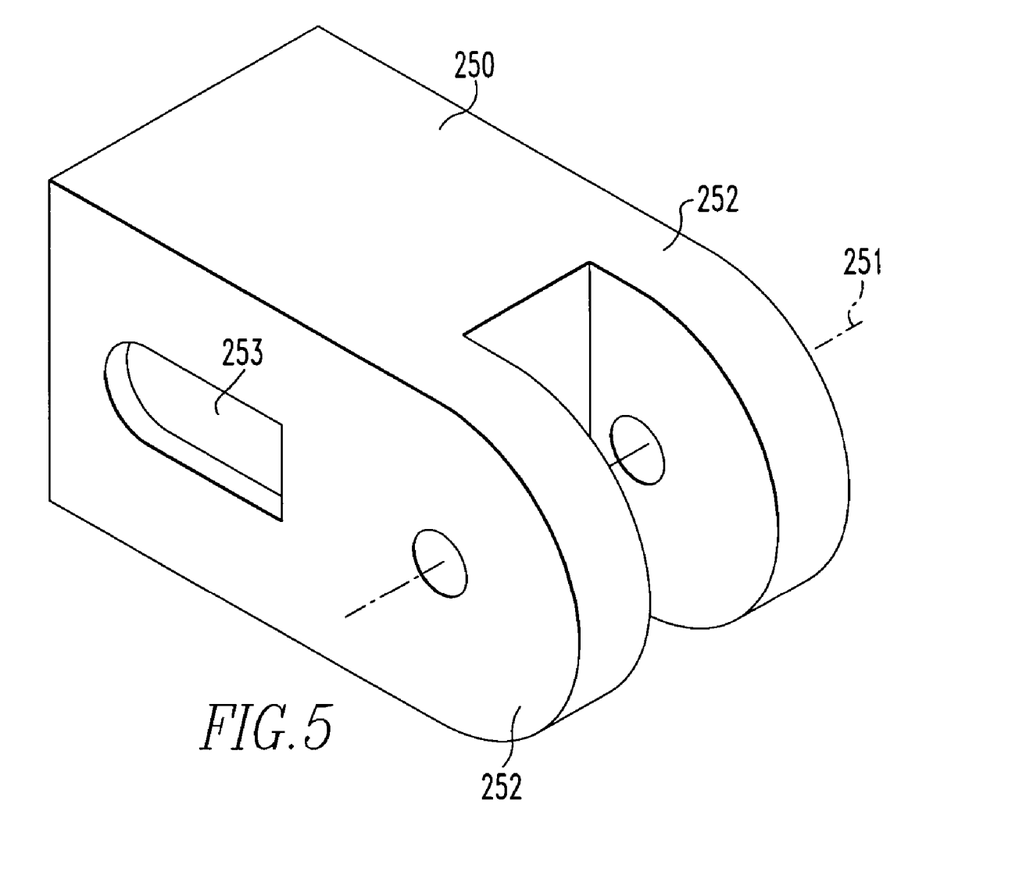
FIG. 5 is a schematic showing the non-rotating portion of a hinge including a depression for engaging a detent.

As best shown in FIGS. 4 and 5, hinge elements having non-rotating portions 250 and rotating portions 286 are preferably positioned on the ends of the U-frame arms 282 and serve to pivotably mount the tailgate extension 200 to the vehicle tailgate 100. Each hinge non-rotating portion 250 includes a depression 253. The depression 253 serves to lock the U-frame member 205 into a closed position for storage by way of a spring-loaded detent 156 within the tailgate.

Each hinge non-rotating portion 250 preferably includes a pair of pin engaging portions 252. A pin (not shown) attaches the hinge rotating portion 286 to the hinge non-rotating portion 250. Relative rotation occurs about axis 251 of the hinge non-rotating portion 250. Such a design allows the U-frame member 205 to rotate almost 180 degrees about the non-rotating portion 250 when the U-frame member 205 is fully extended from the tailgate 100. Thus, the U-frame member can be moved from the step position (FIG. 8) to the extension position (FIG. 6) or to the backstop position (FIG. 7).

A spring-loaded detent 156 (shown schematically as a hidden block in the drawings) is located adjacent each channel 170. The spring loaded detent 156 engages depression 253 on hinge non-rotating portion 250 to retain the tailgate extension 200 in the stored position inside the tailgate (FIG. 2).

Additionally, there is a stop 158 (shown schematically as a hidden block in the drawings). Preferably, stop 158 engages the hinge non-rotating portion 250 to prevent the tailgate extension from being completely removed from the tailgate 100. The stop 158 may, for example only, operate by engaging depression 253 on hinge non-rotating portion 250.

The locking posts 320 on the side braces 310 are for engaging the tailgate latches 180 (schematically indicated in block form in the drawings). When the tailgate extension 200 is in the backstop position, shown in FIG. 7, or the step position, shown in FIG. 8, and the locking posts 320 on the side braces 310 are engaged with the tailgate latches 180, the side braces 310 become diagonal braces which provide rigid positioning of the tailgate extension 200. Rigid positioning of the tailgate extension 200 in the backstop position shown in FIG. 7 and the step position shown in FIG. 8 involves cooperation of the braces 310 and the stops 158.

To realize the step position, the tailgate 100 is first opened by moving it from a vertical position (FIG. 1) to a horizontal position (FIG. 2). The U-frame member 205 is then disengaged from the stored position by disengaging the detent 156 (by pressing a release button and/or pulling the U-frame out of the tailgate 100) and extending the U-frame from the tailgate until the stop 158 engages the hinge non-rotating portion 250. The braces 310 may then be released from the arms 282 of the U-frame member 205. This may be accomplished by withdrawing each brace 310 laterally from a clip in the side of the U-frame member 205. The U-frame member 205 may then be pivoted downward until it is possible to engage the locking posts 320 located on the side braces 310 with the tailgate latches 180 located on the sides of the tailgate 100.

Figure 12:
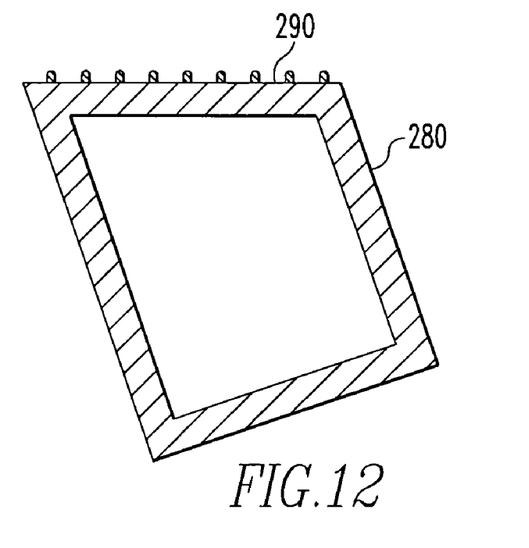
FIG. 12 is a schematic cross section of the step portion of the tailgate extension, indicated as 12—12 in FIG. 8, the step portion having a knurled surface.
Figure 13:
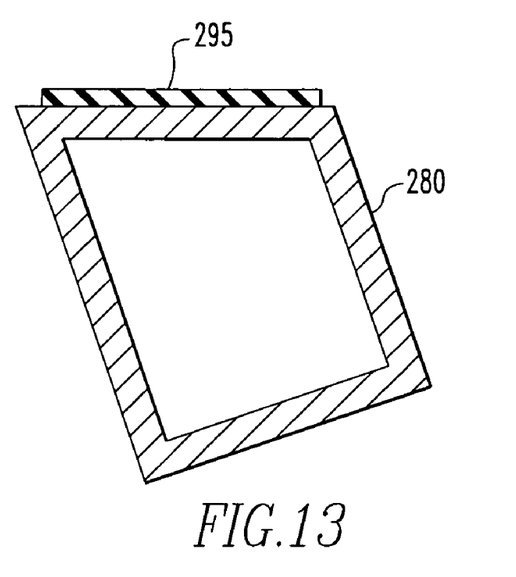
FIG. 13 is a schematic cross section of the step portion of the tailgate extension, similar to FIG. 12, the step portion having a pad.

At this point the U-frame 205 is locked in position, and the U-frame can be used as a step (FIG. 8). In one embodiment of the invention, the step portion 280 of the U-frame member 205 is grooved or knurled in a manner such that traction will be enhanced. FIG. 8 shows the tailgate extension 200 in the step position, and defines a cross section, 12—12. FIG. 12 shows this cross section, and it shows the knurled surface 290 of the step 280. In another embodiment, shown in FIG. 13, a pad 295 may be applied to the step 280 to aid in user traction.

To release the U-frame member 205 from this step position, the braces 310 are disengaged from the tailgate latches 180, preferentially, by pulling the handle 110 on the tailgate 100 and pulling in an upward direction on the side braces 310. The side braces 310 may then be placed in their storage positions in the recesses 350 in the arms 282 of the U-frame member 205. The U-frame member 205 may then be returned to a horizontal position and reinserted into the tailgate by and sliding the U-frame member 205 into the tailgate until the detent 156 engages.

Another potential use of the invention is when the U-frame member 205 is in the tailgate extension position (FIG. 6). This position allows for the hauling of oversized loads, much like a flatbed truck, but with more support for the cargo than with a conventional tailgate. In this position, the U-frame member 205 is extended horizontally from an open tailgate 100, thereby increasing the effective length of the tailgate.

To realize this position, the tailgate 100 is first opened by moving it from a vertical position (FIG. 1) to a horizontal position (FIG. 2). The U-frame member 205 is then disengaged from the stored position by disengaging the detents 156 and extending the U-frame from the tailgate 100 until the locking posts 320 on the side braces 310 can be captured by the tailgate latches 180, as shown. In this position, the side braces 310 are substantially parallel to the arms 282 of the U-frame 205, and the side braces 310 prevent the tailgate extension 200 from being pulled fully out, so the channels 170 in the reinforcing module 175 prevent the U-frame member 205 from rotating downward.

At this point, the U-frame member 205 is locked in position and the U-frame can function as an extension of the existing tailgate 100 (FIG. 6). To release the U-frame member 205 from this position, the braces 310 are removed from the latch mechanism 242 in the tailgate by pulling the handle 110 on the tailgate 100. They are then replaced in their storage positions, within the recesses 350 of the U-frame arms 282. The U-frame member 205 may then be reinserted into the tailgate 100 by sliding it into the tailgate until the detent 156 engages.

The present invention may also be used with the U-frame member 205 in the backstop position (FIG. 7). This position allows for the hauling of oversized loads that may potentially fall out of the bed when the tailgater 100 is in a horizontal position.

To place the U-frame member 205 in the backstop position, the tailgate 100 is first opened by moving it from a vertical position (FIG. 1) to a horizontal position (FIG. 2). The tailgate extension 200 is then pulled fully out until the stops 158 prevent further movement. This is the configuration shown in FIG. 3. The U-frame member 205 is then rotated upwardly to the vertical position shown in FIG. 7. The side braces 310 are then attached by inserting the locking posts 320 into the tailgate latches 180. In that configuration, the side braces 310 act as diagonal braces which prevent rotation of the U-frame member. The U-frame member 205 then acts as a backstop, preventing the accidental discharge of loads. Cargo may be lashed to the U-frame member 205.

To release the U-frame member 205 from this position, the braces 310 are removed from the tailgate latch mechanism 180 in the tailgate 100 and replaced in their storage positions in the side arms 282 of the U-frame. The U-frame member 205 may then be returned to a horizontal position and reinserted into the tailgate 100 by sliding the U-frame into the tailgate until the detent 156 engages.

In order for the side braces 310 to place the U-frame member 205 in a vertical position for use as a backstop, or a slanting position for use as a step, the hole 365 for the offset portion 330 of side brace 310 may be placed below the axis of rotation 251 of the hinge non-rotating portion 250. Also, the tailgagte latch 180 is preferably designed so that when locking post 320 is engaged with the latch, the locking post 320 is also below axis of rotation 251.

Although the above description details the general structure and use of the present invention, there may also be additional features that can be used with the tailgate extension apparatus. For example, when the tailgate extension is used in the backstop or extension position, the extension is acting as a body panel but only comprises a U-frame. Therefore, there is a large amount of space within the U-frame through which certain types of cargo could fall out of the vehicle.

Figure 11:
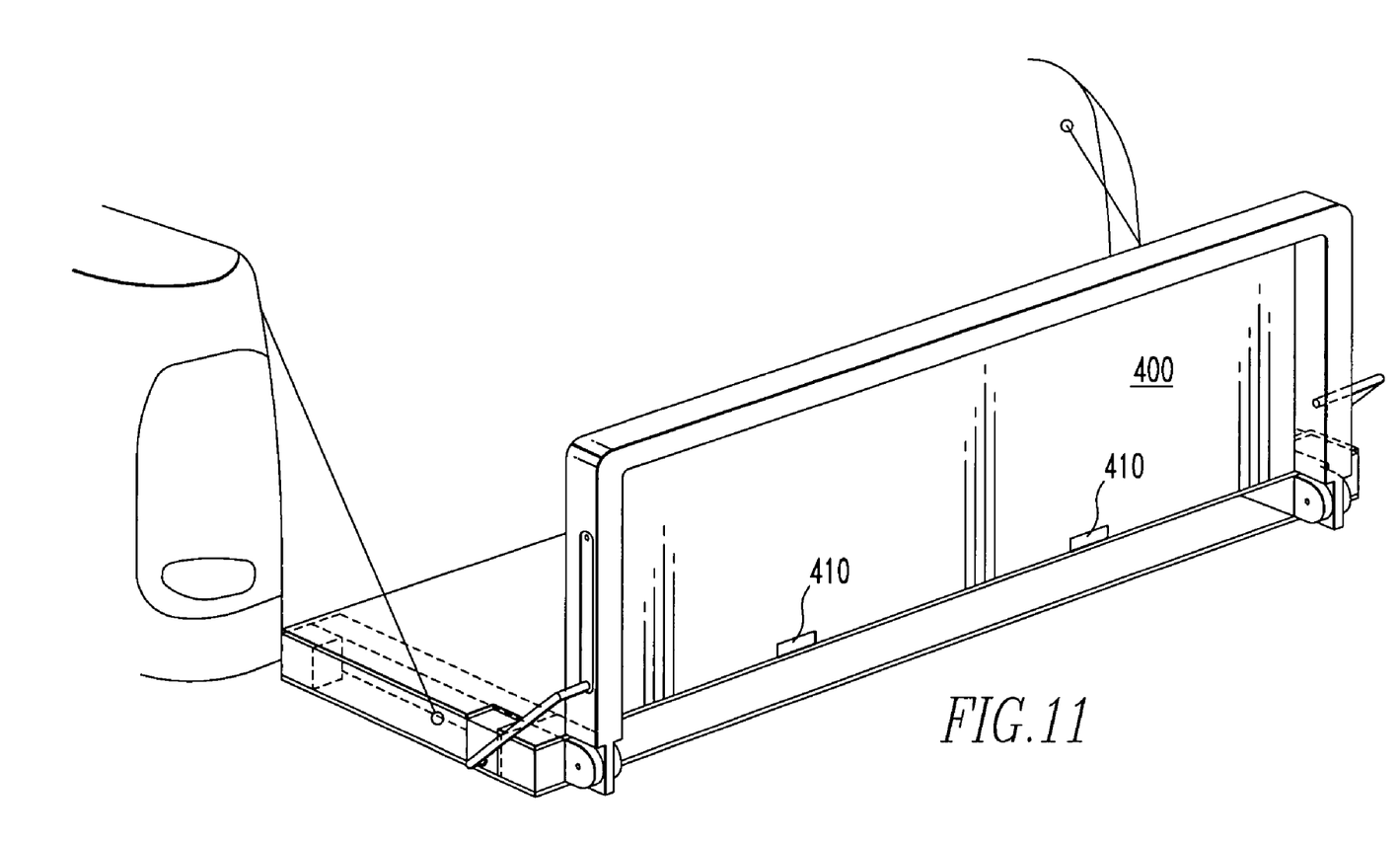
FIG. 11 is a schematic showing the tailgate extension in the backstop position and an optional cover plate.

Therefore, as shown in FIG. 11, one preferred addition to the above tailgate extension apparatus includes a removable cover plate 400 that can be snapped or otherwise attached to the U-frame when necessary. The cover plate 400 may be a thin sheet of plastic, metal, leather, or any other suitable material. Preferably, the additional cover plate 400 is a thin solid sheet that can be attached to the surface of the tailgate that faces the interior of the truck bed or other cargo space. The plate 400 may be attached with a plurality of snaps, bolts, or any other fasteners. When needed, the plate 400 is simply removed from the tailgate and attached to the U-frame member. Once attached, the plate 400 will provide the support of a regular body panel.

It is preferred that the cover plate 400 be attached by hinges 410 to the conventional tailgate at the upper portion of the interior face of the tailgate. When the tailgate is opened and the tailgate extension apparatus is extended and locked into place as a backstop or extension, this additional plate 400 can be rotated on the hinges and swung against the U-frame which will be at a 90 degree (backstop) or 180 degree (extension) orientation from the open tailgate. Once swung into position, the cover plate 400 can be secured to the U-frame 205 with snaps or any other fastening mechanism. It is noted that cover plate 400 is not stored within the tailgate 100, but lies against the top surface of the tailgate when the tailgate is down, which is the inner surface of the tailgate when the tailgate is up.

When the tailgate extension 200 is employed as a step, the cover plate 400 may be rotated to a position on the tailgate 100 so it does not interfere with step 280.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

We claim:

1. An extension apparatus for a vehicle tailgate, comprising:
    a U-frame member, said member being slidingly removable from an interior portion of said vehicle tailgate, said U-frame member comprising a pair of arms each including a recess; and
    a plurality of side braces adapted to lock said U-frame member in a plurality of operative positions, said plurality of side braces contained within said recess of said pair of arms when in a stored position.

2. The extension apparatus of claim 1, wherein said U-frame member further comprises:
a step portion;
said plurality of operative positions including a step position wherein said step portion is below said vehicle tailgate.

3. The extension apparatus of claim 2, wherein at least said step portion of said U-frame is hydroformed.

4. The extension apparatus of claim 2, wherein said step portion includes a knurled surface to aid in traction.

5. The extension apparatus of claim 2, wherein said step portion includes a padded or non-skid surface applied to said step portion to aid in traction.

6. The extension apparatus of claim 1, wherein said plurality of operative positions includes an extension position wherein said U-frame member is substantially co-planar with said vehicle tailgate.

7. The extension apparatus of claim 1, wherein said plurality of operative positions includes a back stop position wherein said step portion is above said vehicle tailgate.

8. The extension apparatus of claim 1, wherein said plurality of side braces lock said U-frame member in said plurality of operative positions by linking between said U-frame and said vehicle tailgate.

9. The extension apparatus of claim 1, wherein said U-frame member is a metal extrusion.

10. The extension apparatus of claim 9, wherein said metal is aluminum.

11. The extension apparatus of claim 1, further comprising:
a pair of channels formed in said interior of said vehicle tailgate, said channels adapted to allow said pair of U-frame arms to slidingly enter and exit said interior of said tailgate.

12. The extension apparatus of claim 11, wherein said channels are formed in a plastic reinforcing module of a hybrid tailgate with a metal skin over said plastic reinforcing module.

13. The extension apparatus of claim 1, further comprising:
a pair of hinge elements attached to said U-frame member to allow said U-frame member to rotate into said plurality of operative positions.

14. The extension apparatus of claim 13, wherein said hinge elements are adapted to slide along channels formed in interior of said vehicle tailgate.

15. The extension apparatus of claim 14, further comprising:
at least one stop to engage at least one hinge element to prevent removal of said U-frame from said tailgate.

16. The extension apparatus of claim 13, further comprising:
at least one detent to lock said plurality of hinge elements into a storage position.

17. The extension apparatus of claim 1, wherein each of said plurality of side braces includes at least one tailgate locking post adapted to be inserted into a latching mechanism on said tailgate.

18. The extension apparatus of claim 17, wherein said braces are adapted to lock said U-frame in a plurality of operative positions.

19. The extension apparatus of claim 1, further comprising:
a cover plate adapted to be attached to said U-frame member.

20. The extension apparatus of claim 19, wherein said cover plate is completely removable from said U-frame member and said vehicle tailgate.

21. The extension apparatus of claim 19, wherein said cover plate is hingedly attached to vehicle tailgate and may be rotated and secured to said U-frame member when said U-frame member is in one of said plurality of operative positions.

22. A method for utilizing a tailgate extension apparatus comprising the steps of:
opening a vehicle tailgate into a substantially horizontal position;
extending a U-frame member from a storage position within said tailgate to a position outside of said tailgate;
pulling plurality of side braces out of a storage location in a recess in said U-frame member; and
locking said U-frame member into an operative position by means of said plurality of side braces.

23. The method of claim 22, further comprising said step of:
rotating said extended U-frame member into said operative position via a plurality of hinge elements before said locking step.

24. The method of claim 23, wherein said operative position is a step position in which at least part of said U-frame member is brought substantially below said opened tailgate.

25. The method of claim 23, wherein said operative position is an extension position in which said U-frame member is brought substantially planar with said opened tailgate.

26. The method of claim 25, further comprising said step of:
attaching a cover plate to said U-frame member such that said cover plate is substantially in a same plane as an upper surface of said opened tailgate.

27. The method of claim 23, wherein said operative position is a back stop position in which said U-frame member is brought substantially perpendicular to said opened tailgate and above said tailgate.

28. The method of claim 27, further comprising the step of:
attaching a cover plate to said U-frame member such that said cover plate is on an inside face of said vertical U-frame member.

29. The method of claim 22, wherein said braces directly connect said U-frame member to said vehicle tailgate.

30. The method of claim 29, wherein said braces are connected to said vehicle tailgate by means of conventional tailgate latches.

* * * * *